United States Patent
Nonaka

(10) Patent No.: US 6,533,508 B1
(45) Date of Patent: Mar. 18, 2003

(54) MACHINING APPARATUS AND MACHINING METHOD

(75) Inventor: Hiroki Nonaka, Nissin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/821,468

(22) PCT Filed: Oct. 12, 1999

(86) PCT No.: PCT/JP99/05609

§ 371 (c)(1), (2), (4) Date: Apr. 9, 2001

(87) PCT Pub. No.: WO00/21705

PCT Pub. Date: Apr. 20, 2000

(30) Foreign Application Priority Data

Oct. 9, 1998 (JP) .......................................... 10-288059
Feb. 25, 1999 (JP) .......................................... 11-048997
Oct. 8, 1999 (JP) .......................................... 11-287537

(51) Int. Cl.$^7$ ................................................. B23C 1/02
(52) U.S. Cl. ........................ 409/132; 82/1.11; 409/200
(58) Field of Search .......................... 409/131, 132, 409/199, 200, 201, 211, 216, 230, 231, 74; 82/1.11, 1.2, 1.4, 1.5, 131

(56) References Cited

U.S. PATENT DOCUMENTS

| | | | | |
|---|---|---|---|---|
| 2,054,168 A | * | 9/1936 | Roehm | 409/143 |
| 4,423,991 A | * | 1/1984 | Derr, Jr. | 409/200 |
| 4,573,840 A | * | 3/1986 | Skrentner | 409/171 |
| 4,789,278 A | * | 12/1988 | Dexter et al. | 409/200 |
| 5,197,836 A | * | 3/1993 | Crivellin | 409/200 |
| 5,482,415 A | * | 1/1996 | Belaga et al. | 409/200 |
| 6,013,002 A | | 1/2000 | Nonaka | |

FOREIGN PATENT DOCUMENTS

| | | | | |
|---|---|---|---|---|
| JP | 50-32590 | 3/1975 | | |
| JP | 58-40210 | 3/1983 | | |
| JP | 59-146704 | 8/1984 | | |
| JP | 207709 A | * 10/1985 | | 409/200 |
| JP | 63-41406 | 3/1988 | | |
| JP | 63-162111 | 7/1988 | | |
| JP | 63-212442 | 9/1988 | | |
| JP | 3-73261 | 3/1991 | | |
| JP | 5-32161 | 5/1993 | | |
| JP | 5-305501 | 11/1993 | | |
| JP | 9-309004 | 12/1997 | | |

* cited by examiner

*Primary Examiner*—Daniel W. Howell
(74) *Attorney, Agent, or Firm*—Oblon, Spivak, McClelland, Maier & Neustadt, P.C.

(57) ABSTRACT

A machining device (6) for machining a workpiece by relatively rotating the workpiece and a tool (1) which comprises a revolving shaft (8) held for rotation on its own axis that is parallel with the center axis, a main shaft (4) that is eccentric with respect to the center axis of the revolving shaft (8) and that rotates on its own axis that is parallel with the center axis of the revolving shaft (8), the main shaft having either the workpiece or the tool (1) mounted on the front end thereof, and rotation drive mechanisms (M1, M3) for rotating the revolving shaft (8) and main shaft (4) at different rpm's.

12 Claims, 12 Drawing Sheets

MACHINING APPARATUS AND MACHINING METHOD

TECHNICAL FIELED

The present invention relates to a machining apparatus and a machining method for machining a workpiece by rotating a tool and the workpiece relatively and, more particularly, to an apparatus and a method for rotating and revolving either the tool or the workpiece.

BACKGROUND ART

In a so-called contouring operation or a machining operation, a cutting tool having a cutting blade is revolved around a work material (workpiece) while the cutting tool is rotated on its own axis. This machining method is typically exemplified by an end milling operation, an example of which is described in Japanese Patent Laid-Open No. 63-212442 (JP-A-63-212442). According to the contouring method described in this publication, before the workpiece is machined by rotating and revolving an end mill, a turning diameter of an edge of the rotating and revolving end mill is measured with a laser beam, and a tool diameter of the end mill is compensated by means of tool diameter compensation function of a numerical control unit on the basis of the result of the aforementioned measurement. In an actual cutting operation, on the other hand, the end mill is at first inserted in the center of a bore to be cut and moved therefrom to a position where the edge of the end mill contacts with the inner surface of the hole to be cut, more specifically, to a position corresponding to a machining diameter, and thereafter moved along the inner face of the bore to be cut. In short, the end mill is revolved by rotating the end mill, as mounted on a spindle of a machine tool, on its own axis and by moving the spindle in a circular motion in a so-called X-Y plane.

In addition to the aforementioned apparatus, there is known an another type of apparatus using a mechanism of a polar coordinate system. More specifically, on a leading end of a main arm, which is rotated or given an oscillatory rocking motion by a motor, there are mounted a motor for the spindle and a tool shaft arm. On a leading end of the tool shaft arm, there is mounted a tool shaft which is rotated by the motor for the spindle. In this kind of apparatus, the tool shaft is moved in a circular motion, that is, revolved either by giving the main arm associated with the tool shaft arm a rocking motion or by rotating the main arm. Radius of revolution of the tool shaft are changed by varying relative angles of the tool shaft arm to the main arm.

There is known a still another type of apparatus which is constructed such that a tool shaft is so mounted on a first axis as to move in the radial direction thereof. This tool shaft is rotated with the first axis, resulting in the tool shaft revolving. The revolution radius of the tool shaft is changed by varying positions of the tool shaft in the radial direction of the first axis.

In the aforementioned contouring operation, a relative speed of the cutting blade to the work material, that is, a cutting speed corresponds to the sum of a circumferential speed of the cutting blade moving in response to rotation of the tool and a speed of a circular motion performed by the cutting blade moving in response to revolution of the tool. According to the aforementioned conventional contouring operation, however, the tool is revolved by giving the spindle having the tool mounted thereon a circular motion, so that the speed of revolution is far lower than the speed of rotation. Therefore, the cutting speed is substantially determined by the speed of rotation of the tool, that is, the number of rotation of the spindle.

In a conventional apparatus using a mechanism of the so-called X-Y coordinate system, the tool is revolved by coordinating the feeds of the spindle in the bisectional directions in the X-Y plane. This restriction of control makes it difficult to revolve the machine tool at a higher speed. When the spindle is moved in the bisectional direction, moreover, a spindle head is vertically moved along a column, and simultaneously with this, the column is horizontally moved on a bed. Thus, the members to be moved have so large mass that the spindle cannot be revolved at a higher speed.

On the other hand, the same problem may occur in an apparatus employing polar coordinate system, in which a reciprocating motion of the main arm is transmitted via its leading end to the tool shaft arm to cause the tool shaft to revolve. Specifically, the main arm is reciprocated with a motor imparting a reciprocating motion to the tool shaft arm and a motor rotating the tool shaft, and the tool shaft is revolved by driving these two motors cooperatively, as in the aforementioned apparatus employing the X-Y coordinate system. Therefore, it is difficult to increase the speed of revolution of the tool shaft.

In still another type of apparatus, too, the tool shaft is revolved with a motor for rotating the tool shaft, so that the overall mass to be revolved is increased, which makes it difficult to revolve the tool shaft at a higher speed. In an apparatus constructed to revolve the tool shaft, the motor for rotating the tool shaft changes its position according to a change of revolution radius of the tool shaft, so that a position of the center of the gravity of a rotating member as a whole changes. As the speed of revolution of the tool shaft is raised, therefore, its vibration may be increased.

In the prior art, in short, it is impossible to increase the speed of revolution of the tool shaft or the cutting tool mounted thereon, and a ratio of revolution speed of the spindle to the cutting speed is not more than 2 to 3%, so that the feed rate per revolution of the tool is lowered. To enhance the working efficiency, therefore, the working operation has to be performed by increasing the speed of rotation of the tool or increasing the width of the cutting blade.

If the cutting width is increased, however, the area where chips contact with the cutting blade is broadened, so that friction and heat is remarkably generated, thereby shortening the tool life. This results in the disadvantage that the working efficiency is greatly restricted. The aforementioned contouring work is the so-called intermittent cutting operation, in which the cutting blade bites into the work material repeatedly. In the method of the prior art as described above, on the other hand, the tool is revolved at a low speed and at a small feed rate, that is, the tool is rotated on its own axis at a high speed, thus increasing the number of times that the cutting blade bites into the work material repeatedly. When this cutting operation is performed, in other words, many wide and long chips are produced. Therefore, an impact force more frequently acts on the cutting blade. Moreover, this impact force is strong, so that the possibility of shortening the tool life is increased, which restricts the working efficiency.

The present invention has been made in consideration of the actual state of art as described above, and has an object to provide an apparatus and a method capable of improving a working efficiency in a machining operation performed by rotating a tool and a workpiece relatively to each other.

Another object of the invention is to provide an apparatus and a method capable of improving a working efficiency and a working accuracy by making it possible to vary a ratio between a number of rotation of the tool or the workpiece and a number of revolution of the tool or the workpiece.

Still another object of the invention is to provide a machining apparatus capable of raising a speed of revolution of the tool or the workpiece at a high level.

Another object of the invention is to provide a machining apparatus capable of changing a radius of revolution of the tool or the workpiece while rotating and revolving the tool or the workpiece.

Another object of the invention is to provide an apparatus and a method capable of improving the working efficiency without shortening the life of the tool.

DISCLOSURE OF THE INVENTION

The machining apparatus of the invention is provided with a spindle rotating while mounting a tool or a workpiece and a revolution shaft rotating on its center axis, and the spindle is rotatably held by the revolution shaft at a position offset from the center axis of the revolution shaft. This machining apparatus is also provided with a rotation driving mechanism for transmitting a power through a rotating member rotating on a center axis of rotation of the revolution shaft or a member rotating integrally with the revolution shaft to the spindle to rotate the same, while rotating the revolution shaft and the spindle at different speeds respectively.

According to the machining apparatus of the invention, therefore, when the spindle and the revolution shaft are rotated on their respective center axes, the tool or the workpiece mounted on a leading end of the spindle is rotated and revolved. By independently rotating the revolution shaft, in this case, the tool or the workpiece mounted on the spindle is revolved. Thus, the speed of revolution is not restricted, so that it is possible to increase a ratio of speed by revolution in the working speed, that is, a relative feeding speed or a feed rate between the tool and the workpiece.

According to the machining apparatus of the invention, moreover, there is provided a motor for revolution having a base portion on which the rotation driving mechanism is fixed, a transmission mechanism for revolution which transmits motive power from the motor for revolution to the revolution shaft, a motor for the spindle fixed on the base portion and a transmission mechanism for the spindle which transmits motive power from the motor for the spindle to the spindle.

With this construction, either of these two motors are fixed, and hence the total mass of rotating elements is decreased, thereby raising the speed of revolution of the spindle at a high level. The transmission mechanism for the spindle is constructed such that torque is transmitted by a roller, thereby preventing fluctuation in rotation of the spindle to allow working operations having a high accuracy.

According to the machining apparatus of the invention, in the revolution shaft, there is arranged an eccentric shaft rotating on an axis eccentric to the center axis of the revolution shaft. At the position eccentric to the center axis of the eccentric shaft, there is rotatably held the spindle.

With this construction, the eccentricity of the tool or the workpiece to the revolution shaft, that is, the revolution radius of the tool or the workpiece is changed by rotating the eccentric shaft. This makes it possible to voluntarily change a relative feed rate of the tool and the workpiece or working radius. By rotating the eccentric shaft during the working operation, moreover, working operations such as taper boring or recessing operation can be performed.

The apparatus of the invention may be provided with a revolution radius changing mechanism for rotating the eccentric shaft relatively to the revolution shaft while permitting the eccentric shaft to rotate integrally with the revolution shaft.

The additional provision of this revolution radius changing mechanism allows for the tool or the workpiece fixed to the spindle to rotate and revolve while changing its revolution radius, which makes it easy to perform a working operation in which the radius of an object to be worked is changed, for example, a taper boring or recessing operation.

This revolution radius changing mechanism is also constructed to have a differential mechanism for performing differential rotation by means of three rotating elements rotating relatively to one another. Among these three rotating elements, a first rotating element is connected to the transmission mechanism for revolution, a second rotating element is connected to the eccentric shaft and a third rotating element is connected to a motor for changing revolution radius fixed to the base portion.

Due to this construction, a mechanism for rotating the spindle, a mechanism for revolving the spindle and a mechanism for changing radius of revolution can operate independently form one another, and a heavy member such as a motor is not carried in a circular motion. This makes it possible to revolve the spindle at a higher speed and to freely set a ratio of rotation number of the spindle to the revolution number of the same accordingly and further to voluntarily change the revolution radius of the spindle during its revolution.

In a machining apparatus provided with the aforementioned eccentric shaft, the spindle is balanced so that the center of gravity is aligned with its center axis, the eccentric shaft having the spindle at its eccentric position is balanced so that the center of gravity is aligned with its center axis, and the revolution shaft having the eccentric shaft fitted thereon holding the spindle rotatably is balanced so that the center of gravity is aligned with its center axis.

With this construction, even when the revolution radius of the spindle is changed by rotating the eccentric shaft, the position of the center of gravity of the entire working apparatus does not change substantially.

As a result, even when the revolution number of the spindle is increased, no vibration occurs. This makes it possible to increase the revolution speed of the spindle, that is, the tool or the workpiece without causing degradation in the working accuracy and increasing the load on the tool.

In the machining method of the invention, the tool and the workpiece are rotated relatively to each other, the amount of working of the tool per unit time is determined on the basis of at least one of a predetermined maximum sectional area to be worked and cutting speed. On the basis of the amount of working per unit time, there is determined a ratio of the rotation number of the tool or the workpiece to the revolution number thereof.

The tool or the workpiece is rotated and revolved so as to satisfy this ratio, thereby working the workpiece.

According to the method of the invention, therefore, it is possible to set a rotation number and revolution number which have excellent working efficiency without shortening the life of the tool and increasing load on the tool, and thus the efficiency of the working operation can be improved.

In the method of the invention, moreover, the tool and the workpiece are brought into contact with each other while being rotated and revolved. The ratio of rotation number of the tool to the revolution number of the same is set to a value below 37, and the workpiece is intermittently cut by the cutting blade mounted on the tool.

According to the method of the invention, a relative feed between the tool and the workpiece is increased in the intermittent cutting operation in which the tool is rotated. For this reason, cutting amount or working efficiency is not decreased even if the cutting width per blade is reduced. In other words, as the cutting width per blade is reduced without degradation of working efficiency, heat generation, cutting resistance and impact force can be reduced, thereby improving the life of the tool. By increasing the cutting amount per blade within the tool life, moreover, the working efficiency can be improved.

In another method of the invention, the workpiece is cut by means of the blade while one of the tool having the blade and the workpiece is rotated and revolved. Of the cutting speeds at which the workpiece is cut by the blade, the ratio of cutting speed established by the revolution of the tool or the workpiece is set to not less than 7% to cut the workpiece intermittently.

According to the method of the invention, the relative feed between the tool and the workpiece can be increased, so that the load applied to the tool can be decreased according to the reduction of the cutting width per blade to improve the tool life and to improve the working efficiency by increasing the cutting amount within the life of the tool.

In the still another machining method of the invention, the machining operation is performed by rotating and revolving the tool or the workpiece. The ratio of the rotation number to the revolution number is changed on the basis of surface roughness of worked surface formed on the workpiece to perform the aforementioned working operation.

According to the machining method of the invention, various working operations such as rough work or finish work can be performed by means of one apparatus or tool, resulting in the reduction in not only cost of installation but also in number of working steps to raise the working efficiency to a higher level.

In still another method of the invention employing the aforementioned machining apparatus, the machining operation is performed by moving the tool or the workpiece backwards and forwards relatively in the axial direction while rotating and revolving the tool or workpiece. Simultaneously, the ratio of rotation number to revolution number is raised between a working step for moving the tool or the workpiece forwards in the axial direction and working step for moving the tool or the workpiece backwards in the axial direction.

According to this machining method, therefore, the rough work wherein the ratio of rotation number to revolution number is decreased and the finish work wherein this ratio is increased can be performed while the tool or the workpiece moves backwards and forwards in the axial direction. As a result, a total working time can be shortened to improve the productivity.

BEST MODE FOR CARRYING OUT THE INVENTION

Figure 1:
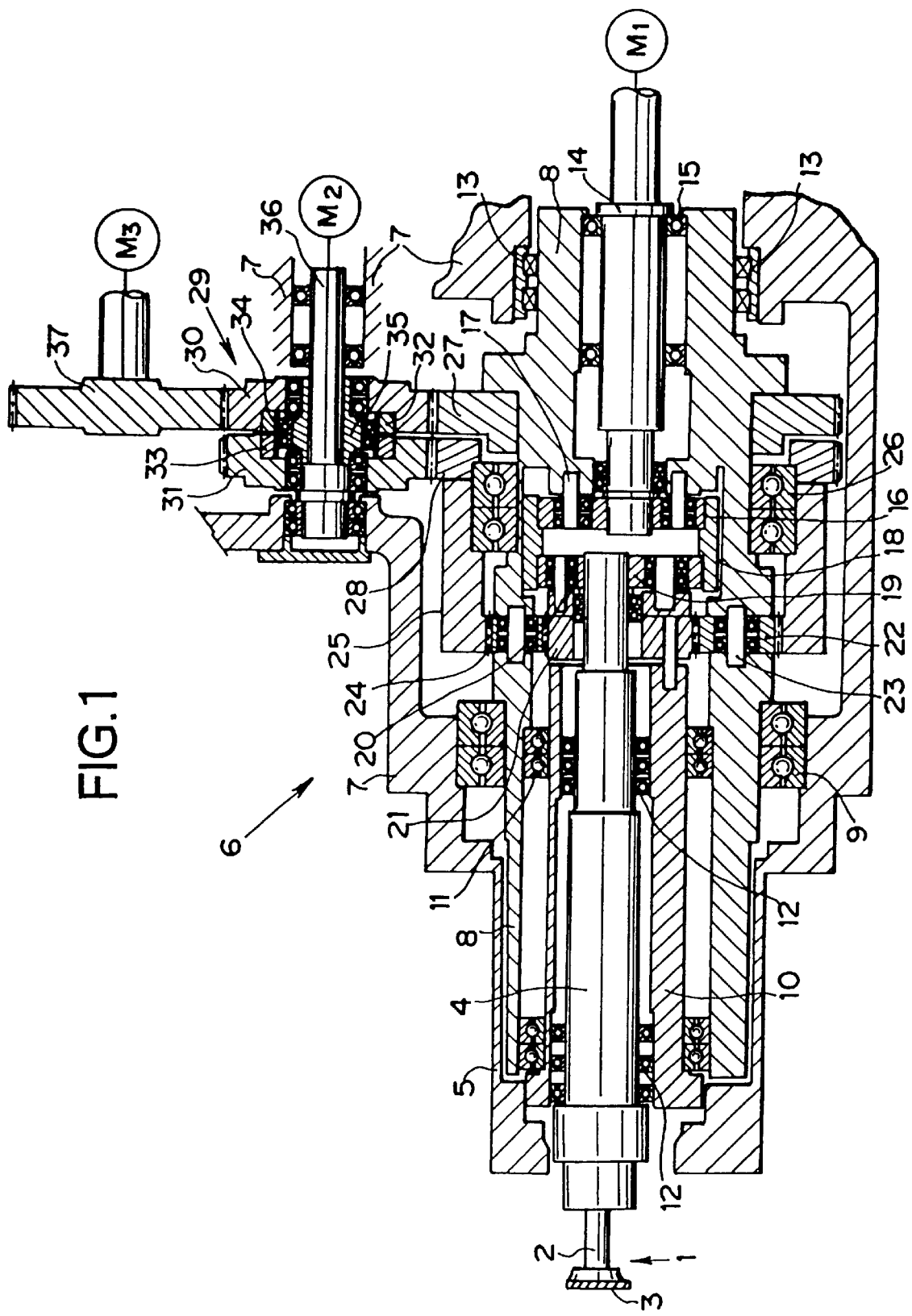
FIG. 1 is a sectional view showing one embodiment of a machining apparatus according to the invention.

The invention will be specifically described with reference to the accompanying drawings. First of all, a machining apparatus according to the invention is described by adopting a cutting apparatus as an example. In FIG. 1, a tool 1 is exemplified by a milling cutter having cutting blades 3 formed on the outer circumference of a leading end portion of a shank 2, and a spindle 4 having the tool 1 mounted in its leading end portion is arranged in a holding shaft 5. This holding shaft 5 is formed into a cylindrical shape and integrated with an entire housing (i.e., base portion) 7 of a cutting apparatus, as indicated by reference numeral 6 in FIG. 1. Therefore, the holding shaft 5 is moved with respect to a (not-shown) workpiece to be cut, but will not rotate on its axis.

In this holding shaft 5, a revolution shaft 8 is rotatably held by bearings 9. In this revolution shaft 8, there is formed a bore, which is extended in the axial direction of and with an eccentricity to the axis of the revolution shaft 8 and in which an eccentric shaft 10 is rotatably held by bearings 11. Therefore, this eccentric shaft 10 revolves around the axis of the revolution shaft 8 as this shaft 8 rotates on its axis. This eccentric shaft 10 is provided for changing radius of revolution of the spindle 4. In this eccentric shaft 10, there is formed a through bore, which is extended therethrough in the axial direction of and with an eccentricity to the axis of the eccentric shaft 10 and in which the spindle 4 is rotatably held by bearings 12.

Figure 2:
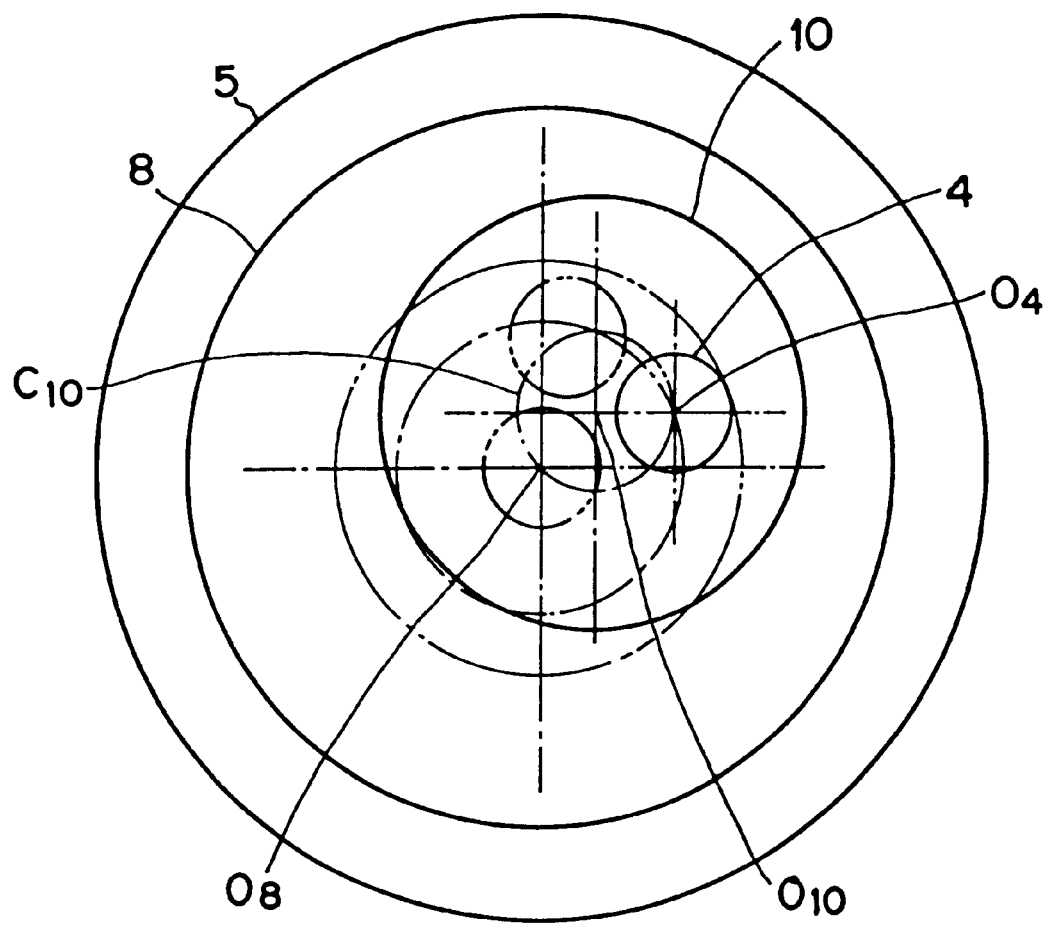
FIG. 2 is a diagram for explaining the relative positions, as taken in the radial directions, of a spindle, an eccentric shaft, a revolution shaft and a retaining shaft of the apparatus.

FIG. 2 shows the relative positions of the aforementioned individual shafts in the radial directions schematically. As shown, the revolution shaft 8 is arranged on the same axis as that of the holding shaft 5. In the revolution shaft 8, there is arranged the eccentric shaft 10 which has an axis $O_{10}$ at a position eccentric to the axis $O_8$ of the revolution shaft 8. The spindle 4, as rotatably arranged in the eccentric shaft 10, is positioned eccentrically to the axis $O_{10}$ of the eccentric shaft 10.

As the eccentric shaft 10 is rotated, therefore, the spindle 4, as located outside of the axis $O_{10}$ of the eccentric shaft 10, moves on a circumference $C_{10}$ which is centered on the axis $O_{10}$. When the eccentricity of the eccentric shaft 10 to the revolution shaft 8 and the eccentricity of the spindle 4 to the eccentric shaft 10 are equal, the axis $O_4$ of the spindle 4 may be aligned to the axis $O_8$ of the revolution shaft 8 to reduce the eccentricity of the spindle 4 to the revolution shaft 8 to zero. By rotating the eccentric shaft 10, more specifically, there is changed the eccentricity of the spindle 4, as arranged in the eccentric shaft 10, to the revolution shaft 8. When the eccentricity of the eccentric shaft 10 to the revolution shaft 8 and the eccentricity of the spindle 4 to the eccentric shaft 10 are equal, the eccentricity of the spindle 4 to the revolution shaft 8 is changed to zero or more within a limit of two times of the equal eccentricity.

The tool 1, as mounted in the spindle 4, rotates together with the spindle 4. Since this spindle 4 is held in the revolution shaft 8, on the other hand, the spindle 4, i.e., a tool 1 revolves around the axis $O_8$ of the revolution shaft 8 as the revolution shaft 8 rotates on its axis. In this case, The radius of revolution of the spindle 4 determines the eccentricity of the spindle 4 to the revolution shaft 8, which is set by rotating the eccentric shaft 10.

This revolution shaft 8 is extended at its righthand end portion, as seen in FIG. 1, to the rear end portion of the housing 7 and is rotatably supported by the housing 7 through bearings 13 fitted on the outer circumference of its rear end portion. In the rear end portion of the revolution shaft 8, there is formed a concentric through hole, in which an input shaft 14 is rotatably held through bearings 15. This input shaft 14 is provided for rotating the spindle 4 and is connected to a spindle motor M1. This spindle motor M1 is fixed on the housing 7 acting as the base portion. On the other hand, the input shaft 14 has its lefthand end portion extended in the revolution shaft 8 to a position close to the rear end portion of the spindle 4.

Moreover, a plurality of rollers 16 having different external diameters are arranged, being in contact with the outer surface of the input shaft 14, at the end portion of the input shaft 14. These rollers 16 are rotatably mounted on support pins 17 which are mounted on the revolution shaft 8 so as to be in parallel with the axis of the input shaft 14. Moreover, a cylindrical member 18 is fitted to enclose those rollers 16. Here, these rollers 16 are press-fitted between the cylindrical member 18 and the input shaft 14 to transmit the torque through a frictional force because their contact pressures are high.

The cylindrical member 18 encloses the outer circumference of the rear end portion of the spindle 4. Between this outer circumference of the spindle 4 and the inner circumference of the cylindrical member 18, there are press-fitted a plurality of rollers 19 having different external diameters like the aforementioned rollers 16. The rollers 19 are rotatably supported by support pins 20, which are connected to a ring-shaped gear 21 arranged rotatably around the outer circumference of the spindle 4 through a bearing. The ring-shaped gear 21 is further connected to the rear end portion of the aforementioned eccentric shaft 10 by pins.

Thus, the torque of the input shaft 14 is transmitted to the cylindrical member 18 by the rotations of the rollers 16 contacting with the outer circumference of the input shaft 14, and the torque of the cylindrical member 18 is transmitted to the spindle 4 by the rotations of the rollers 19 contacting with the inner circumference of the cylindrical member 18. In short, as the input shaft 14 is rotated by the motor M1, its torque is transmitted to rotate the spindle 4. As the individual rollers 16 and 19 revolve relative to one another, moreover, there is changed the eccentricity of the spindle 4 to the input shaft 14, namely, the revolution radius of the spindle 4.

In the portions of the revolution shaft 8 on the side of the outer circumference of the ring-shaped gear 21, there are formed a plurality of cut-away portions which are opened in the inner and outer circumferences and in which there are arranged intermediate gears 22 meshing with the ring-shaped gear 21. The thicknesses of the revolutionary shaft 8 at the individual portions, in which the intermediate gears 22 are arranged, are made different from one another because the axes of the bores extending in the axial direction are eccentric to the axis of the revolution shaft 8. Therefore, the external diameters of the individual intermediate gears 22 are made different according to the thicknesses of the revolution shaft 8 at those individual portions. In other words, the circle joining the outermost circumferences of the individual intermediate gears 22 is centered on the axis of the revolution shaft 8. Here, the individual intermediate gears 22 are rotatably supported by support pins 23 which are mounted on the revolution shaft 8.

On the other hand, the individual intermediate gears 22 mesh with a revolution radius changing gear 24 acting as an internal gear. This revolution radius changing gear 24 is formed in the inner circumference of the leading end portion of a cylindrical shaft 25. This cylindrical shaft 25 is fitted coaxially with the input shaft 14 on the outer circumference of the revolution shaft 8 and is rotatably held by bearings 26.

On the outer circumference of the revolution shaft 8, as located on the outer circumference of the input shaft 14, there is fixed a revolution shaft gear 27. Adjacent to this revolution shaft gear 27, there is arranged an intermediate shaft gear 28 which is fixed on the aforementioned cylindrical shaft 25. The revolution shaft gear 27 meshes with an input gear 30 in a differential mechanism 29, and the intermediate shaft gear 28 meshes with an output gear 31 in the differential mechanism 29.

Figure 3:
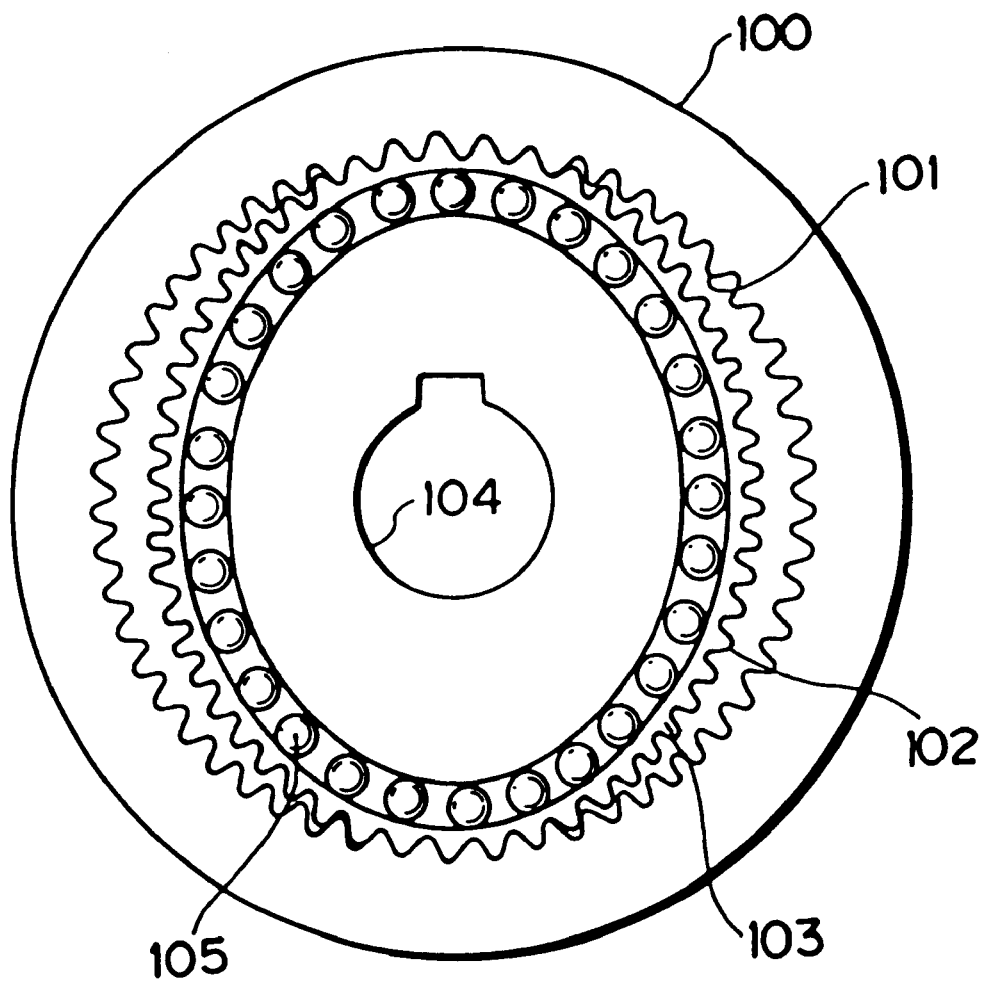
FIG. 3 is a mechanical diagram for explaining a fundamental mechanism employed in a differential mechanism.

Here will be described this differential mechanism 29. The differential mechanism 29 is constructed by making use of the mechanism having a construction shown in FIG. 3. In FIG. 3, more specifically, a ring-shaped member 100 is splined in its inner circumference to have teeth 101, and external teeth 102 having a smaller number of teeth than the teeth 101 are formed on a flexible ring 103 which is rotatably arranged in the inner circumference of the ring-shaped member 100. In the inner circumference of the flexible ring 103, there is arranged through a bearing 105 an elliptical rotary member 104, which has two longer-diametrical end portions pushing the flexible ring 103 into meshing engagement with the teeth 101 of the ring-shaped member 100. In the mechanism shown in FIG. 3, therefore, the number of teeth of the flexible ring 103 is less than that of the ring-shaped member 100. As a result, even when the flexible ring 103 makes one rotation, the ring-shaped member 100 does not make one rotation to have the angle of rotation which is reduced by the difference in the number of teeth.

Figure 4:
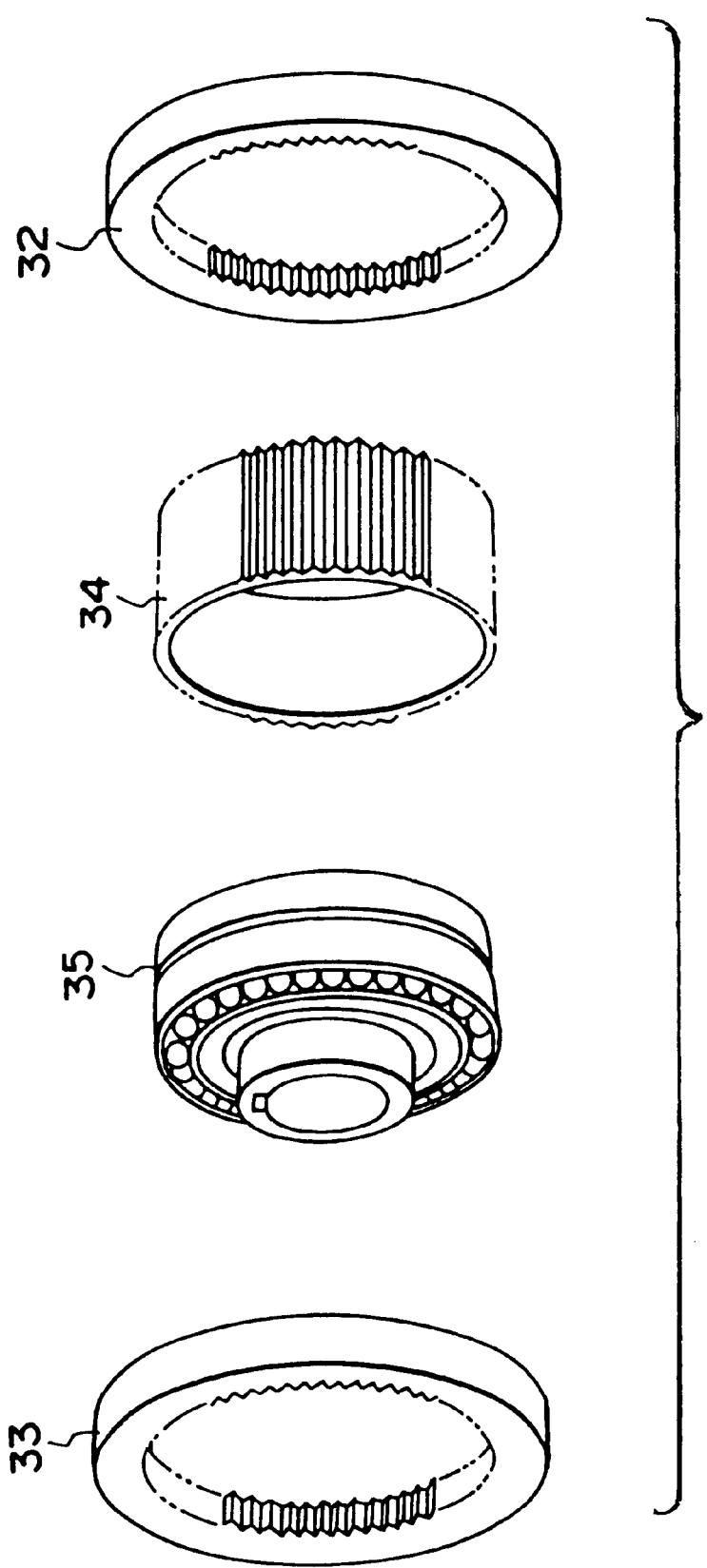
FIG. 4 is an exploded schematic view of the components of the differential mechanism.

FIG. 4 shows the differential mechanism 29 schematically in an exploded view. This differential mechanism 29 includes: a pair of circular splines 32 and 33 corresponding to the aforementioned ring-shaped member 100; a flexible spline 34 corresponding to the aforementioned flexible ring 103 to mesh with those circular splines 32 and 33; and a wave generator 35 fitted in the inner circumference of the flexible spline 34 and corresponding to the elliptical rotary member 104. More specifically, the differential mechanism 29 includes: the paired cylindrical circular splines 32 and 33 having the splined inner circumferences; the flexible spline 34 made of a flexible cylindrical member and splined in its outer circumference to mesh with the splined teeth of the circular splines 32 and 33; and the wave generator 35 equipped with an elliptical cam having an outer periphery fitting a ball bearing which fits the flexible spline 34 on its outer periphery.

One circular spline 32 is set to have a number of teeth (e.g., 200) equal to that of the flexible spline 34 and is fitted and fixed in the inner circumference of the input gear 30. On the other hand, the other circular spline 33 is set to have a slightly larger number of teeth (e.g., 202) than the flexible spline 34 and is fitted and fixed in the inner circumference of the output gear 31. Moreover, the wave generator 35 is fixed on an adjusting shaft 36, which is connected to a radius changing motor M2. Here, this radius changing motor M2 is fixed on the housing 7 corresponding to the base portion.

In this differential mechanism 29, therefore, when the input gear 30 is rotated with the wave generator 35 or the adjusting shaft 36 being fixed, the flexible spline 34 rotates at the same rotation number as that of the input gear 30, because the number of teeth of the circular spline 32 fixed in the input gear 30 is equal to that of the flexible spline 34. On the contrary, the number of teeth of the circular spline 33 fixed in the output gear 31 is larger than that of the flexible spline 34, so that the output gear 31 is decelerated to rotate according to the difference in the number of teeth. In the embodiment thus far described, the flexible spline 34 has the number of teeth "200" whereas the circular spline 33 has the number of teeth "202", so that the output gear 31 is decelerated to rotate at a ratio of 200/202=100/101.

Thus, there arises a difference in the number of rotations, but, even in such a case, a ratio of number of teeth between the input gear 30 and the revolution shaft gear 27 and a ratio of number of teeth between the output gear 31 and the intermediate shaft gear 28 are so set that the revolution radius of the spindle 4 may not change. When the input gear 30 has the number of teeth "100" whereas the revolution shaft gear 27 has the number of teeth "200", for example, the output gear 31 is set to have the number of teeth "101" whereas the intermediate shaft gear 27 is set to have the number of teeth "200". In the case of this construction, the input gear 30 is rotated at 101 rpm, for example, with the adjusting shaft 36 or the wave generator 35 being fixed. Then, the output gear 31 rotates at 100 rpm whereas the revolution shaft gear 27 rotates at 101/2 rpm. Moreover, the output gear 31 rotates at 100 rpm so that the meshing intermediate shaft gear 28 rotates at 100×101/200=101/2 rpm. In short, the revolution shaft gear 27 and the intermediate shaft gear 28 rotate at an equal speed.

Therefore, the number of rotations of the revolution shaft 8 and the number of rotations of the cylindrical shaft 25 become equal. As a result, there rotate altogether the revolution radius changing gear 24 formed on the cylindrical shaft 25, the intermediate gears 22 meshing with the first gear 24, and the ring-shaped gear 21 meshing with the second gears 22. In short, the phases of the individual rollers 16 and 19 are kept constant in the direction of revolution.

Because of the difference in the number of teeth between the flexible spline 34 and the circular spline 33 on the side of the output gear 31, on the other hand, the circular spline 33 is decelerated at a rate corresponding to the difference in the number of teeth with respect to the rotation of the flexible spline 34. In the aforementioned embodiment, the difference in the number of teeth is "2", so that the circular spline 33 is decelerated at a rate of 2/200=1/100 with respect to the rotation of the flexible spline 34. In other words, when the flexible spline 34 is rotated at 100 rpm together with the adjusting shaft 36, the circular spline 33 relatively rotates at minus (−) 1 rpm. Here, no difference occurs in the number of rotations between the circular spline 32 on the side of the input gear 30 and the flexible spline 34, because they have an equal number of teeth. After all, when the flexible spline 34 is rotated together with the adjusting shaft 36, a difference occurs between the rotational phases of the input gear 30 and the output gear 31. In other words, it is possible to establish the relatively rotational motions between the input gear 30 and the output gear 31 at the rotational speed of 1/100 of the number of rotations of the adjusting shaft 36.

This relative rotation appears as a relative rotation between the revolution shaft 8 and the ring-shaped gear 21, namely, as a relative speed of revolutions between the individual rollers 16 and 19. Moreover, these relative revolutions between the individual rollers 16 and 19 change the eccentricity of the spindle 4 to the input shaft 14, i.e., the revolution radius, so that the apparatus thus far described can make it easy to adjust the revolution radius finely. Here, reference numeral 37 in FIG. 1 indicates a revolution gear, which meshes with the aforementioned input gear 30. To this revolution gear 37, moreover, there is connected a revolution motor M3, which is fixed on the housing 7. On the other hand, the aforementioned revolution radius changing motor M2, the differential mechanism 29, the line for transmitting the torque from the differential mechanism 29 to the revolution shaft 8, and the line for transmitting the torque from the differential mechanism 29 to the eccentric shaft 10 construct a revolution radius changing mechanism altogether.

In the cutting apparatus shown in FIG. 1, moreover, the revolutions of the spindle 4 are achieved not by the combination of the linear motions in the two-dimensional directions but by the rotations of the revolution shaft 8 enclosing the spindle 4 so that the spindle 4 can be rotated and revolved at high speeds. In the aforementioned example, on the other hand, the eccentricity of the spindle 4 to the revolution shaft 8 can be changed by the rotation of the eccentric shaft 10, so that the revolution radius of the spindle 4 can be changed. It is, therefore, possible to easily perform the cutting operations of tapered holes, the boring operations for a plurality of kinds of different internal diameters, and the recessing operations.

Here, the line for transmitting the torque from the motor M1 for the spindle 4 corresponds to a transmission mechanism for rotating the spindle of the invention, the line for transmitting the torque from the motor M3 for revolution to the revolution shaft 8 corresponds to a transmission mechanism for revolution of the invention and a mechanism having combination of these two transmission mechanism corresponds to a rotation driving mechanism of the invention.

When the cutting operation is performed by mounting the tool 1 on the spindle 4, the spindle 4 and the revolution shaft 8 are turned to rotate and revolve the spindle 4, and the eccentric shaft 10 is rotated to change the revolution radius of the spindle 4. The aforementioned three shafts are balanced as described hereinafter so as to prevent vibration which occurs when the individual shafts are rotated.

Figure 5:
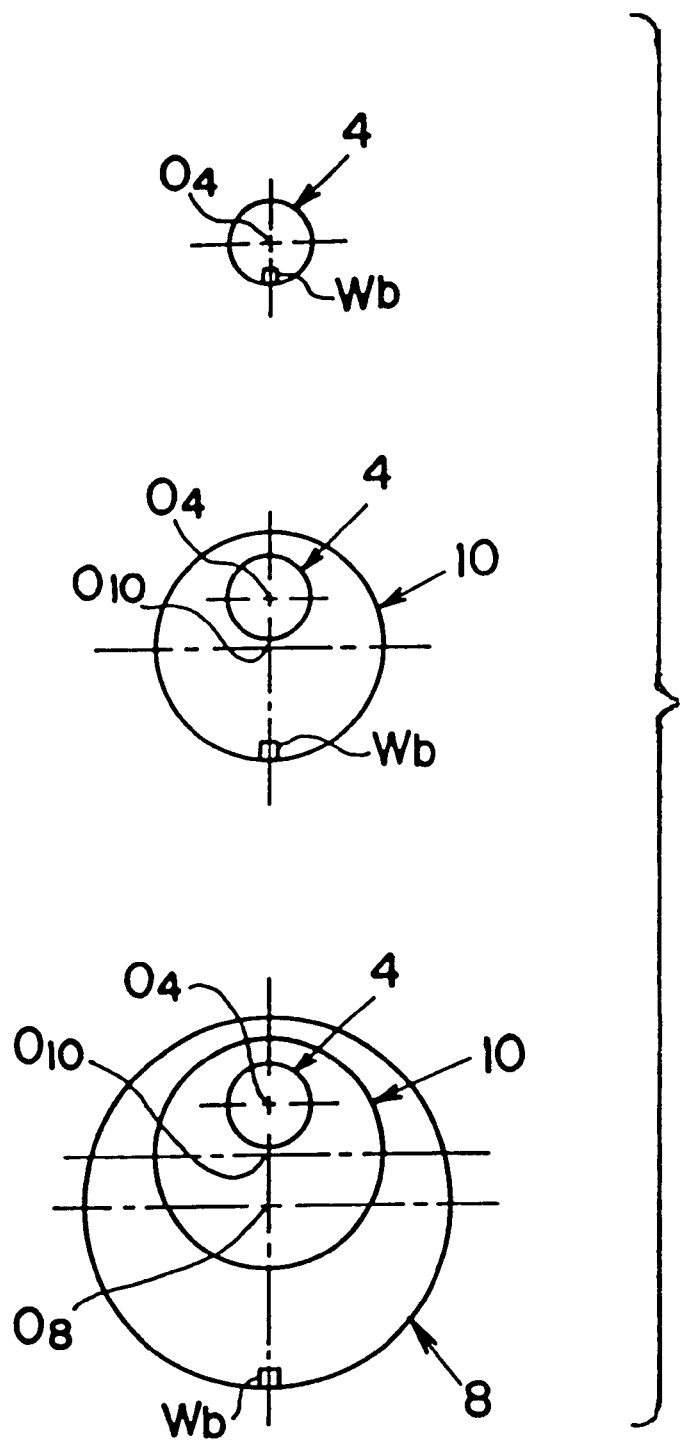
FIG. 5 is a diagram for explaining balance adjustment of individual shafts.

FIG. 5 is a diagram for explaining the balance adjustment of the individual shafts. With the tool or a weight equal to the same being mounted on the leading end of the spindle 4, the spindle 4 is balanced so that the center of gravity is aligned with a center axis $O_4$. This balance adjustment can be made by adding/removing a predetermined mass Wb, for example, by cutting away a portion from the outer circumference of the spindle 4 or mounting a weight for adjustment such as a screw. The balance adjustment is made not only in the radial direction but also in the axial direction.

The eccentric shaft 10 is balanced so that the center of gravity as a whole is aligned with a center axis $O_{10}$, with the spindle 4 thus balanced being assembled at a position offset from this center axis $O_{10}$. This balance adjustment can be made by applying/removing the predetermined weight Wb on or from a portion of the outer circumference of the eccentric shaft 10 as in the aforementioned example.

The revolution shaft 8 is balanced so that the center of gravity is aligned with its center axis $O_8$ by applying/removing the predetermined weight Wb on or from a portion of its outer circumference, with the eccentric shaft 10 on which the spindle 4 is attached and balanced as described before being located at a position offset from the center axis $O_8$. The revolution shaft 8 and the eccentric shaft 10 are also balanced in their axial directions.

When the revolution shaft 8 is rotated to revolve the spindle 4, the center of gravity as a whole is aligned with the center axis $O_8$ of the revolution shaft 8, and therefore no vibration occurs even if the spindle 4 is revolved at a high speed, whereby at least the off-set load and resultant vibration are prevented or suppressed. Such a state is maintained even when the revolution radius of the spindle 4 is changed. In short, each of the spindle 4 and the eccentric shaft 10 is balanced so that the center of rotation is aligned with the center of gravity. The spindle 4 and eccentric shaft 10 thus balanced are held by the revolution shaft 8, so that the center of gravity substantially is aligned with the center axis $O_8$. For this reason, even when the position of the spindle 4 in the radial direction is changed by rotation of the eccentric shaft 10, the position of the center of gravity as a whole does not change. Both before and after revolution radius of the spindle 4 is changed, therefore, there occurs no change in the balance, so that vibration can be effectively prevented or suppressed even if the spindle 4 is rotated at a high speed.

Here will be described a method of machining the workpiece by means of the machining apparatus of the invention. In the cutting apparatus according to the invention, as described hereinbefore, the spindle motor M1 and the revolution motor M3 individually fixed on the housing 7 are activated to rotate and revolve the spindle 4, that is, the tool 1 attached thereto. This makes it possible to raise the speed of revolution to a higher level than the conventional methods and to appropriately set the ratio K between the rotation number of the tool and the revolution number of the same accordingly. This ratio K seriously affects the tool life and the working efficiency and is therefore determined first of all.

Figure 6:
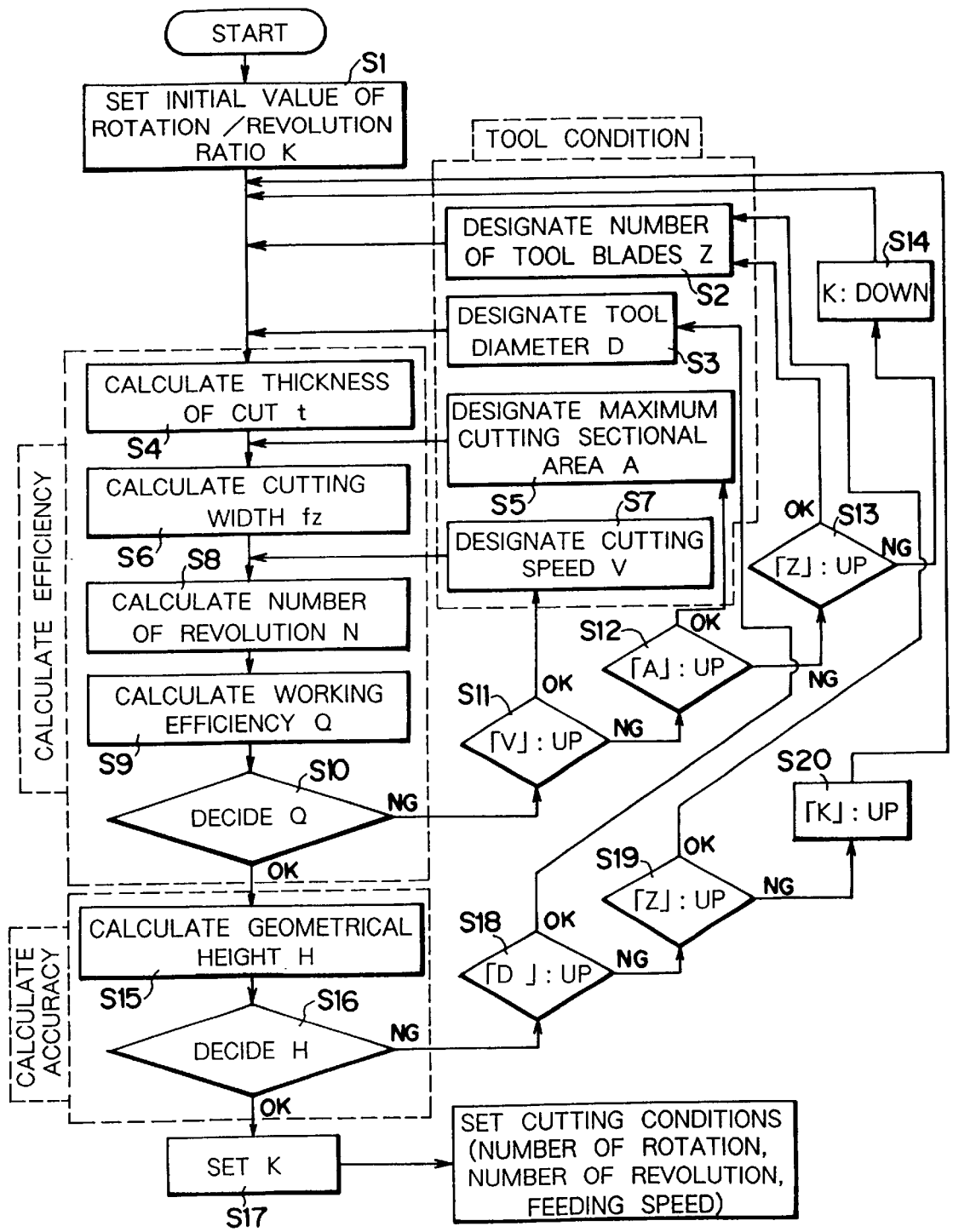
FIG. 6 is a flow chart for explaining a method for determining a rotation/revolution ratio.

FIG. 6 is a flow chart showing a method of determining a rotation/revolution ratio K, an initial value of which is first set (at Step S1). If this rotation/revolution ratio K is "7", the tool 1 makes one revolution while rotating on its own axis once. This can be applied to the boring operation. The contouring operation for intermittently cutting workpiece is performed when the rotation/revolution ratio K is a value exceeding "1". Thus, a smaller value of those ensuring the contouring work, for example, an integer "2" is adopted as an initial value of the rotation/revolution ratio K.

On the other hand, a tool to be employed is decided on the basis of material or shape of workpiece to be cut, so that the number of blades Z of the tool is indicated (at Step S2) and a tool diameter D1 is also set (at Step S3).

Figure 7:
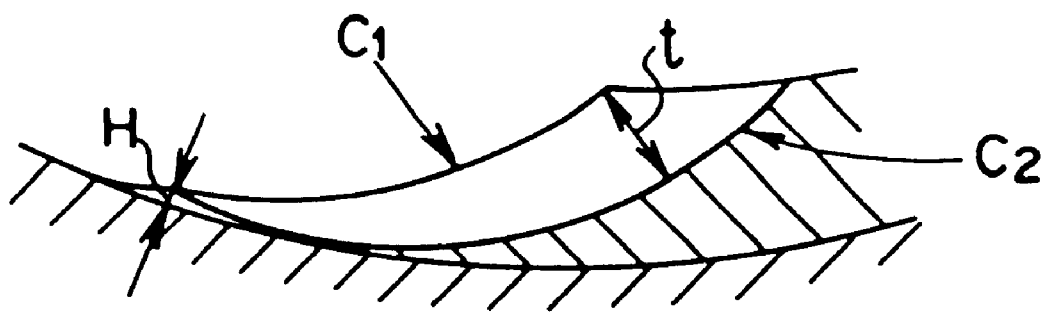
FIG. 7 is a schematic view showing loci of movement of a blade edge on a portion to be cut.

A thickness t to be cut is calculated on the basis of these rotation/revolution ratio K, the number of blades Z of the tool and a diameter D0 of a bore to be worked of the product (at Step S4). FIG. 7 is a schematic enlarged diagram of a cut portion, a line indicated by the reference numeral C1 is a locus of a leading blade and a line indicated by the reference numeral C2 is a locus of a subsequent blade. These loci of the individual blades are formed by rotating and revolving the tool. At Step S4, there is calculated a width of a portion where an interval between the loci of the individual blades is largest. This calculation can be geometrically made on the basis of the respective data concerning the tool such as Z, D1 and the rotation/revolution ratio K.

On the other hand, a maximum cutting sectional area A is indicated (at Step S5). This maximum cutting sectional area A is an instantaneous maximum value during the cutting operation and is set on the basis of current data such as data in the boring operation for a tool. Specifically, load applied to each blade of the tool is raised according to a cutting sectional area, and the maximum cutting sectional area to be allowed for the tool is preset as data for the tool. At Step S5, the maximum cutting sectional area A is set on the basis of the these existing data.

A cutting width fz (=A/t) is calculated on the basis of the cut thickness t calculated at Step S4 and the maximum cutting sectional area A set at Step S5 (at Step S6).

Moreover, a cutting speed V is set as a condition of a tool to be employed (at Step S7). The cutting speed V is a relative speed of the cutting blade to the workpiece. The cutting blade is liable to be rapidly worn away, the higher the cutting speed V becomes, so that the tool life is shortened. From the cutting conditions, therefore, there is determined the tool life, and the cutting speed V is set on the basis of this tool life.

The cutting speed V is a sum of the circumferential speed of the cutting edge caused by rotation of the tool and the circumferential speed of the cutting edge moved by revolution of the tool. Thus, the revolution number N is calculated on the basis of the rotation/revolution ratio K set at Step S1 and the cutting speed V set at Step S7 (at Step S8). Specifically, the revolution number N is determined by the following formula, wherein D0 is a diameter of a bore to be cut and D1 is a diameter of the tool.

$$N = V \times 1000 / [\pi \times \{D0 + D1(K-1)\}]$$

Here, the cutting speed V is expressed by the sum of a cutting speed VA of the revolving tool and a cutting speed VB of the rotating tool, and the individual cutting speeds VA and VB are determined by the following Formulas.

$$VA = N \times D0 \times \pi$$

$$VB = N \times (K-1) \times D1 \times \pi$$

Thus, the working efficiency Q is calculated (at Step S9). This working efficiency Q is a cutting amount per unit time and calculated on the basis of the revolution number N, the cutting width fz, the working diameter D0 and a raw material diameter D2. It is decided (at Step S10) whether the working efficiency Q thus calculated satisfies requirement. This decision is made on the basis of a demanded cycle time of the cutting operation, for example.

If the answer of Step S10 is negative, it is decided (at Step S11) whether the cutting speed V can be increased. When a cutting speed is set to a smaller value than the maximum cutting speed allowed for the tool at Step S7, the answer of Step S11 is affirmative, and the routine advances to Step S7, at which the cutting speed V is increased within an allowable range. In short, the cutting condition is changed to increase the working efficiency Q.

If the answer of Step S11 is negative, on the contrary, it is decided (at Step S12) whether the cutting sectional area A can be increased. If the maximum cutting area A is set to a smaller value than the maximum value at Step S5, the answer of Step S12 is affirmative, then the routine advances to Step S5, and the maximum cutting sectional area A has a large value. In short, the cutting condition is changed to increase the working efficiency Q.

If the answer of Step S12 is negative, on the contrary, it is decided (at Step S13) whether the tool can be changed for one having a large number of blades Z. In short, this possibility of change is decided due to whether or not there is a prepared tool. If the change with a tool having a large number of blades Z is possible, the routine advances to Step S2, and a newly selected number of blades Z is indicated. In this case, the number of blades Z is increased, so that the cutting conditions are changed to increase the working efficiency Q.

If the answer of Step S13 is negative because the change of the tool is not possible, the rotation/revolution ratio K is lowered, in short, the number of revolution is relatively increased, so that the unit cutting length per blade is increased and the working efficiency is increased.

Here, in the aforementioned steps, the cutting conditions are selected on the basis of the result of decision of the working efficiency Q, but the rotation/revolution ratio K is set to a small value in Step S1, so that a high working efficiency is gained. Therefore, there is generally no possibility that the answer of Step S10 is affirmative and the change of the working condition indicated at the beginning is required.

After the decision on the working efficiency Q is made as described before, the working accuracy is decided. Because the cutting blade makes a rotationary motion as shown in FIG. 7, the inner face of the workpiece is cut away to form an arc-shaped recess. While a portion remained after cut by the blade is cut in by the following blade, the tool slightly moves in the circumferential direction of the worked bore according to the revolution speed. Therefore, there remains a ridge having a triangular section whose height is indicated by the reference numeral H in FIG. 7. The height H of the ridge is related to the moving distance of the tool till the following blade cuts in the workpiece, that is, the revolution speed of the tool, as shown in FIG. 7, and the height H becomes larger as the revolution number increases. If the result of decision on the working efficiency Q is affirmative, therefore, the routine advances to Step S15 and a geometrical height H of the ridge or the remaining portion after cut is calculated using the rotation/revolution ratio K (at Step S15).

This height H appears as the error in the cutting depth or surface roughness and is therefore decided in contrast with a demanded accuracy (at Step S16). As the revolution speed or revolution number of the tool is increased, the moving distance of the tool during the rotation through a predetermined angle is increased, and the height H of the ridge left after cut is increased accordingly. In case the initial value of the rotation/revolution ratio K is set to a small value, therefore, the height H is increased and the working accuracy is lowered. In the case of the rough machining, for example, the answer of Step S16 may be affirmative, even if the rotation/revolution ratio K is an initial value. In this case, there is adopted a value of the rotation/revolution ratio K, the cutting conditions such as the rotation number, revolution number or feeding speed of the tool are set. Here, the rotation number can be determined by multiplying the revolution number N determined at Step S8 by the rotation/revolution ratio K (N×K).

On the contrary, the more closely the locus of the blade approximates a straight line, that is, the larger the tool diameter D1 is, the height H is smaller, so that the working accuracy is improved. In case the answer of Step S16 is negative because the height H of the protruding portion left after cut is so large as not to meet requirement, therefore, it is decided (at Step S18) whether the tool diameter D1 can be increased, that is, whether the tool can be changed for a tool having a larger diameter D1.

If the answer of Step S18 is affirmative, the routine advances to Step S3 and a diameter D1 of a new tool is indicated. On the contrary, if the answer of Step S18 is negative, it is decided (at Step S19) whether the current tool can be changed for a tool having a large number of blades Z. As described above, specifically, as the moving distance of the tool in the interval between the time when the leading blade cuts in the workpiece and the time when the following blade cuts in the workpiece increases, the height H of the protruding portion left after cut becomes larger. Therefore, if the interval between the leading blade and the following blade is short because of the number of blades being large, the height H of this protruding portion is reduced. In case the diameter D1 of the tool cannot be increased, therefore, it is decided whether the number of blades Z can be increased. If the answer of this step is affirmative, the routine advances to Step S2 and the number of blades Z of a new tool is indicated.

On the contrary, If the answer of Step S19 is negative, the rotation/revolution ratio K is increased (at Step 20). In short, the moving distance of the tool towards the circumferential direction of the bore to be worked is reduced by relatively lowering the revolution number.

In case the diameter D1 of the tool is increased because an affirmative decision is made at Step S18, or in case the number of blade Z is increased because an affirmative decision is made at Step S19, or in case the rotation/revolution ratio K is raised at Step S20, the working efficiency Q is changed according to the changes in these working conditions. Therefore, the aforementioned routines from Step S4 to Step S10 are executed to make the calculation and decision of the working efficiency Q again. In case the decision on the working efficiency Q is affirmative or in case the working conditions are changed on the basis of the calculation and the decision of the working efficiency Q, the height H of the protruding portion left after cut is calculated again (at Steps S15) and the decision on this height H is made (at Step S16). Thus, there is determined the rotation/revolution ratio K which satisfies the requirements of the working efficiency Q and the working accuracy, and the cutting conditions such as rotation number, revolution number or feeding speed are set on the basis of this rotation/revolution ratio K.

Figure 8:
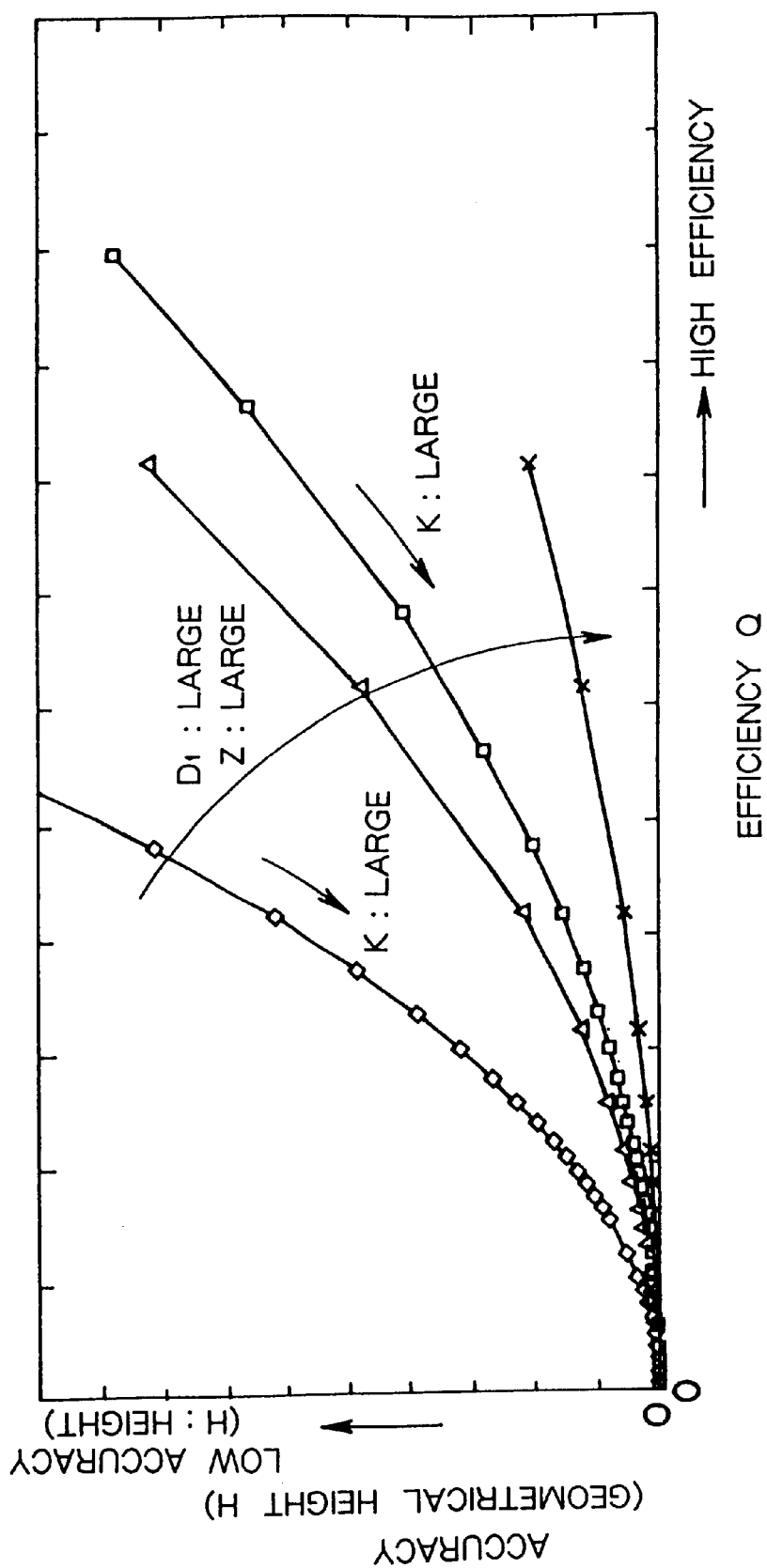
FIG. 8 is a diagram showing tendencies of changes in working efficiency and working accuracy corresponding to changes in a rotation/revolution ratio, a tool diameter and the number of blades.

FIG. 8 is a diagram showing the tendencies for the working efficiency Q and the working accuracy (the aforementioned height H) to change according to the rotation/revolution ratio K, the diameter D1 of the tool and the number of blades Z. In short, the larger the rotation/revolution ratio K becomes, the higher the working efficiency Q becomes and the lower the working accuracy becomes. On the other hand, the larger the diameter D1 of the tool becomes, the higher the working accuracy becomes. As the number of blades Z is increased, the working accuracy becomes higher.

Figure 9:
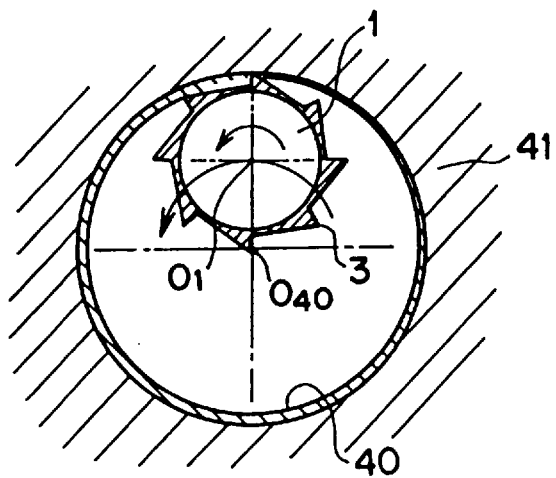
FIG. 9 is a schematic view showing a relative position between a tool in the state where an inner face of a bore is cut by means of the machining apparatus shown in FIG. 1 and a bore to be cut.
Figure 11:
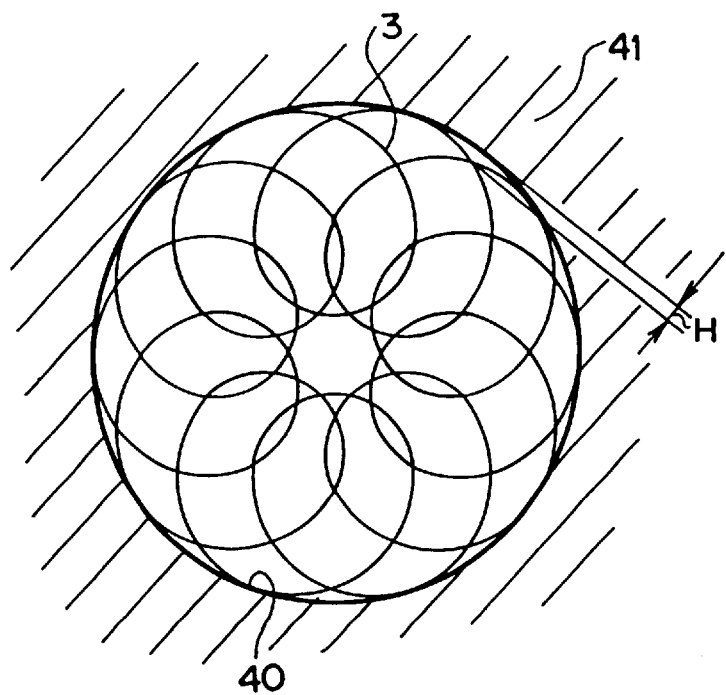
FIG. 11 is a diagram showing a locus of the blade edge on the basis of a machining method of the invention.

On the basis of the cutting conditions thus set, there are controlled the speeds of the spindle motor M1 and the motor M3 for revolution. Moreover, the cutting operation is performed by moving the spindle 4 together with the holding shaft 5 in the axial direction. FIG. 9 is a schematic diagram showing the state where a boring operation is performed using the tool 1 mounted on the cutting apparatus described hereinbefore. By activating the spindle motor M1, the tool 1 is rotated on its own axis $O^1$ (i.e. the axis $O_4$ of the spindle 4). Simultaneously (at the same time), by activating the motor M3 for revolution, the revolution shaft 8 is rotated, and the spindle 4 or the tool 1 is revolved on the axis $O_8$ of the revolution shaft 8, that is, the center axis $O_{40}$ of the bore 40 to be worked.

While the spindle motor M1 and the motor M3 for revolution are activated, therefore, the holding shaft 5 is moved and inserted into the bore 40 to be worked by the tool 1. The tool 1 is rotated and revolved, so that the workpiece 1 is cut by the cutting blade 3, mounted on the outer circumference of the leading end of the tool 1, at cutting speed determined by adding the circumferential speed of the tool 1 being rotated to the speed at which the tool 1 being revolved is fed in the circumferential direction of the bore 40 to be worked. In this case, the apparatus shown in FIG. 1 is almost free from restriction on the revolution speed of the tool 1, so that the cutting operation is performed by increasing the revolution speed. Specifically, the rotation/revolution ratio K is set to be smaller than "37". Moreover, as the revolution number is increased, the cutting width is reduced. This is done because the increase in the revolution number causes the feed of the tool to increase, resulting in the increase of the length of chips and the cutting amount.

Figure 10:
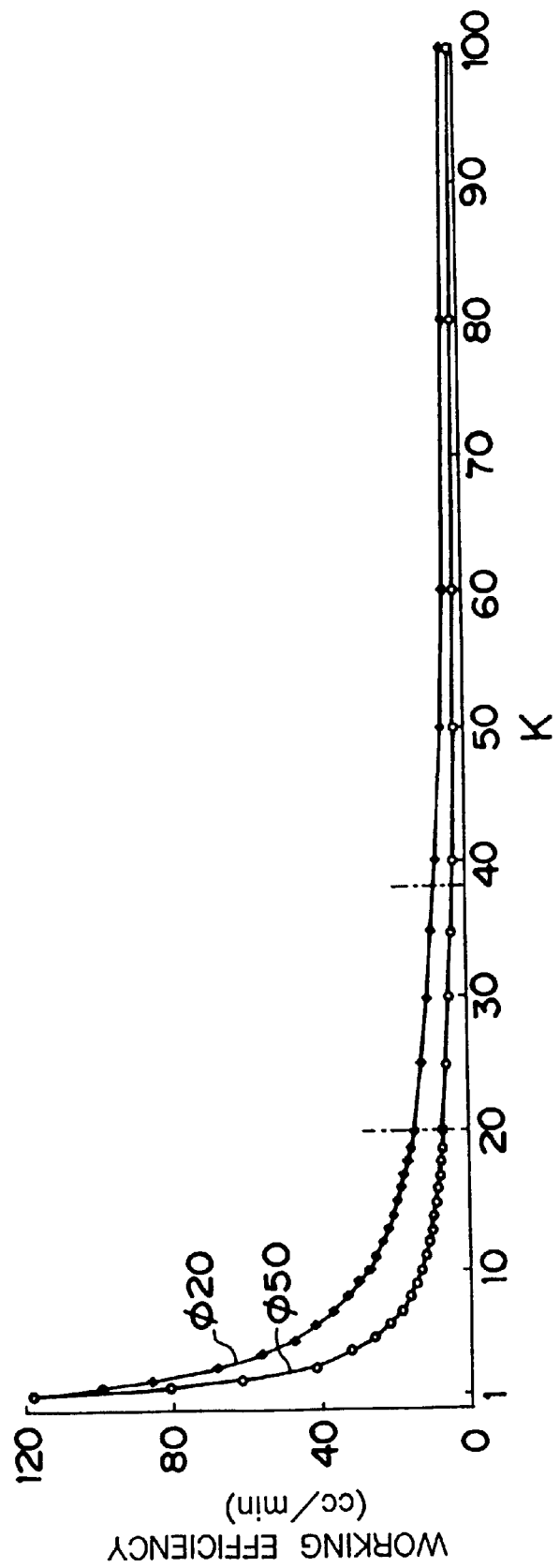
FIG. 10 is a diagram showing a result of determination of relation between the rotation/revolution ratio and the working accuracy.

FIG. 10 is a diagram showing the result of measurement of relations between the rotation/revolution ratio K and the working efficiency. Here, the working efficiency is expressed by cutting volume (cc) per unit time (min). This determination result is obtained in the case where a bore having an internal diameter of 55 mm is cut at the cutting speed of 200 m/min and by the cutting width of 0.6 mm. The tools employed are an end mill having an outer diameter of 20 mm and an end mill having an outer diameter of 50 mm.

Since the revolution number is large, as shown in FIG. 10, the smaller the rotation/revolution ratio K becomes, the more the working efficiency increases. When the rotation/revolution ratio K becomes smaller than "37", the tendency for the working efficiency to increase becomes remarkable. Specifically, the working efficiency obtained in the case where the rotation/revolution ratio K is smaller than "20" is twice or more the working efficiency obtained when the rotation/revolution ratio K is set to around "100". In FIG. 10, incidentally, the working efficiency in the case of the rotation/revolution ratio K being "1" is that of the boring operation or continuous cutting operation. The cutting speed in the contouring work is the sum of the speed at which the blade is rotated when the tool is rotated and the speed at which the blade is fed when the tool is revolved. However, the aforementioned cutting apparatus of the invention sets no limit to the revolution number, resulting in the increase of the speed at which the blade is fed when the tool is revolved. Specifically, in this invention, the ratio between the speed at which the blade is fed by the revolution of the tool and the cutting speed is set to be more than 7%. This setting may be made by changing either the revolution radius or the revolution number.

Figure 12:
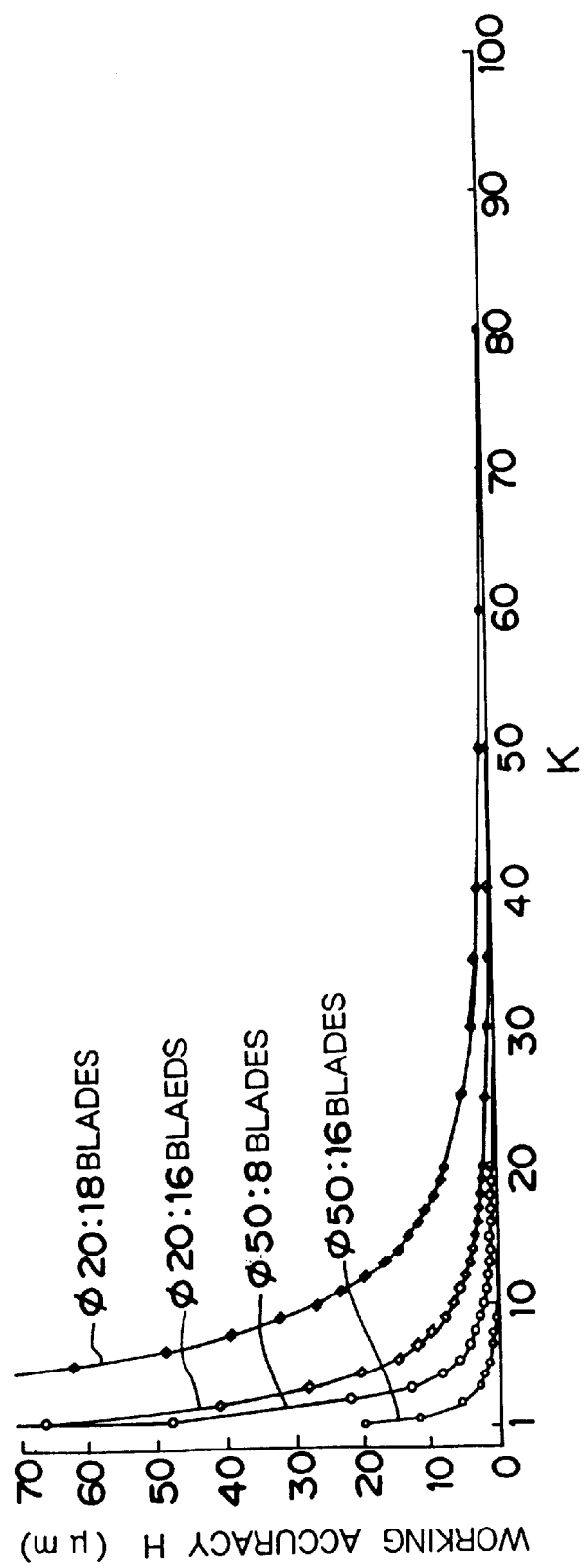
FIG. 12 is a diagram showing a result of determination of relation between the rotation/revolution ratio and the working accuracy.

In the contouring work in which the tool is rotated and revolved, the tool is fed by a predetermined distance while the blade makes one turn, so that the edge forms loop-shaped loci along the inner circumferential face of the bore 40 to be worked. Therefore, there is produced a part of the workpiece over which the tool is fed while the edge is not applied on the workpiece. In short, this part remains as a portion left after cut, while projecting towards the center of the bore 40 to be worked. The height H of the portion left after cut can be employed as a reference value for the working accuracy. FIG. 12 is a diagram showing the result of measurement of relations between the rotation/revolution ratio K and the working accuracy H ($\mu$m). The cutting conditions under which this measurement has been made are: an inner diameter of the bore to be worked=55 mm; the cutting speed=200 m/min; and the cutting width=0.6 mm. The tools employed are: an end mill having the outer diameter of 20 mm and 8 blades; an end mill having the outer diameter of 20 mm and 16 blades; an end mill having the outer diameter of 50 mm and 8 blades; and an end mill having the diameter of 50 mm and 16 blades.

The cutting apparatus of this invention sets no limit to the revolution number, so that the rotation/revolution ratio K can be reduced to "1", in which the continuous cutting operation is made, and the working accuracy can be voluntarily set accordingly. In short, in the cutting method of the invention, the rotation/revolution ratio K is set on the basis of the working accuracy, that is, the roughness of surface to be worked. Thus, various cutting operations from rough machining to finish machining can be performed without changing tools. In case the inner face of a predetermined bore is worked, for example, the rough machining is performed at the feeding stroke by reducing the rotation/revolution ratio K and the finish machining having a high working accuracy is performed at the return stroke by increasing the rotation/revolution ratio K. This makes it possible to finish the work of products in a short period of time and improve the productivity.

Here will be enumerated the example of the machining method of the invention and the example of the convention end milling.

Example of Contouring Work of the Invention

Here, a diameter of the bore to be worked is 65 mm, a diameter of the tool is 25 mm, and the number of blades is 8. The cutting speed is set to 200 m/min, in which the speed of the tool being rotated is 142.1 m/min (71.05%) and the speed of the tool being revolving is 57.9 m/min (28.95%). In this case, the rotation/revolution ratio K is 1809.3/283.5= 6.38 (<37). Therefore, the feed rate per blade is 4 mm, and the cutting width in axial direction is set to 1 mm and shared by 51 blades. Moreover, the depth of cut in radial direction is set to 2 mm. The time required to the cutting operation is 1.1763 mins. The number of workpieces machined until the wear rate of the flank becomes 0.3 mm is 200.

Example of Conventional End Milling

Here, a diameter of the bore to be worked is 65 mm, a depth of work is 50 mm, a diameter of the tool is 25 mm, the number of blades is 8. The cutting speed is set to 200 m/min, in which the speed of the tool being rotated is 196.99 m/min (98.5%) and the speed of the tool being revolving is 3.01 m/min (1.5%). In this case, the rotation/revolution ratio K is 196.99/3.01=65.45 (>37). Therefore, the feed rate per blade is 0.15 mm, and the cutting width in axial direction is set to 4 mm (cutting width per blade). Moreover, the depth of cut in radial direction is set to 2 mm. The time required to the cutting operation is 0.8481 mins. The number of workpieces machined until the wear rate of the flank becomes 0.3 mm is 20.

According to the method of the invention, as clarified by these examples of the cutting operations, even if the cutting width of the bore to be worked in the axial direction is small, the cutting operation is finished in a short period of time and the working efficiency can be raised more than ever before. Moreover, the life of tool can be improved over that of the prior arts. These improvements may be made on the basis of the fact that the feeding rate per blade is large, so that the frequency of impact acting on the edge or impact force is reduced and also the fact that the cutting operation of the invention is an intermittent one differently from the boring operation, so that the edge can be air-cooled, whereby wear caused by adhesion or oxidization can be suppressed and damage such as chipping caused by mechanical shock can be also suppressed.

The invention has been hereinbefore described on the basis of the specific embodiment. However, the invention should not be limited to the forgoing specific embodiment, but the eccentric shaft 10 shown in FIG. 1 may be replaced by a fixed shaft which is incapable of rotating, for example. Even if the apparatus of the invention has such a construction, the cutting operation in which the feeding rate is large can be performed by increasing the revolution number. In the construction shown in FIG. 1, moreover, the torque is transmitted through a roller or a gear. The transmission of the torque may be always transmitted through a gear or a roller, or may be transmitted through a winding transmission device using a chain and the like. The cutting apparatus of the aforementioned specific embodiment is constructed to use a motor for rotation, a motor for revolution and a motor for changing revolution radius. But, either of these three motors may be removed and replaced with a speed changing mechanism, through which torque may be distributed between the motor for rotation, the motor for revolution and the motor for changing revolution radius. The differential mechanism of the invention is not limited to the construction described in the forgoing specific embodiment but may be constructed to make differential actions by rotating the three rotary elements relatively to each other.

In the foregoing specific embodiment, there is adopted the case where the inner face of the bore is cut as an example. According to the method of the invention, however, various cutting operations can be performed; for example, cutting of the outer surface of a shaft, cutting of the inner face of a tapered bore or cutting of the outer face of a tapered shaft. In the taper cutting of this kind, the revolution radius of the tool is changed by continuously rotating the eccentric shaft 10 shown in FIG. 1 during the cutting operation, whereby allowing the taper cutting to be easily performed. Moreover, the method of the invention can be applied to the cutting of the external and internal threads or drilling operations. In any one of these cutting operations, the working efficiency can be improved by increasing the number of revolution and raising the feed rate more than that of the prior arts.

Moreover, the method of the invention can be applied to a machining apparatus which rotates the workpiece instead of the tool. Such an apparatus is exemplified by a lathe shown in FIGS. 13 and 14. This lathe is provided with a base 200, an X axis table 201 and a Y axis table 202. On the bed 200, there is arranged the X axis table 201 and the Y axis table 202 stacked in an upper and lower two stages. In short, the X axis table 201 is arranged on the bed 200 through a linear guiding mechanism 203 moving in the direction perpendicular to the longitudinal direction of the bed 200. The Y axis table 202 is arranged on the X axis table 201 through a linear guiding mechanism 204 moving in the longitudinal direction of the bed 200. On the Y axis table 201, there is fixed the apparatus shown in FIG. 1, in which the axis of the spindle 4 is parallel to the moving direction of the Y axis table 202. In the apparatus shown in FIGS. 13 and 14, at the leading end of the spindle 4, there is fitted a chuck 206 holding a workpiece 205.

At one end portion of the bed 200 in the longitudinal direction, moreover, there is fitted a column 207 extending in the vertical direction. On the upper end portion of the column 207, there is mounted a tool head 208, to which a tool 209 such as a bit is fitted and projected toward the chuck 206. On the both sides of the column 200 in the moving direction of the X axis table 201, there are located a loading portion 210 and an unloading portion 211 for the workpiece 205. By moving the X axis table 201, therefore, the chuck 206 fitted to the spindle 4 is moved to respective positions facing the loading portion 210, the tool 209 and the unloading portion 211. By moving the Y axis table 202, moreover, the chuck 206 is moved backwards and forwards with respect to each of the loading portion 210, the tool 209 and the unloading portion 211.

Figure 13:
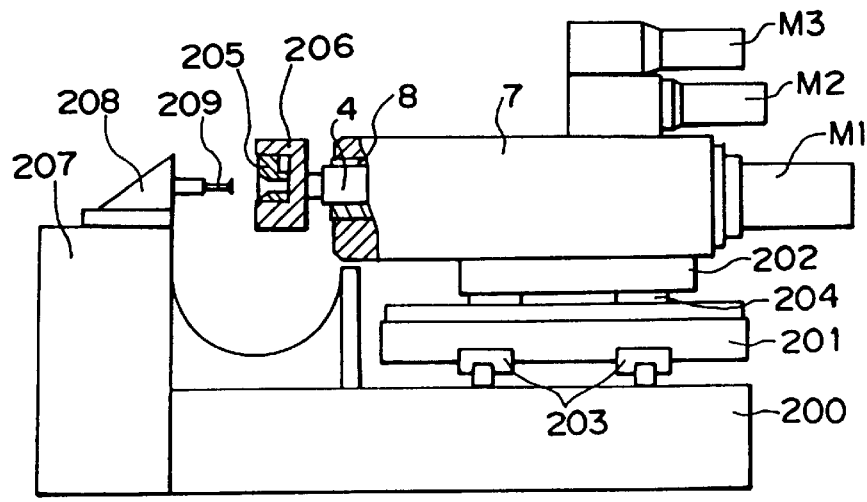
FIG. 13 is a front elevation schematically showing another embodiment in which the invention is applied to a lathe.
Figure 14:
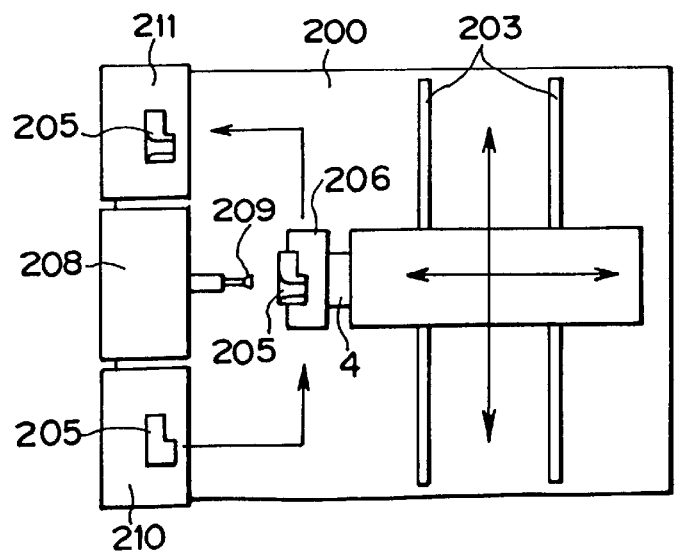
FIG. 14 is a plan view schematically showing another embodiment in which the invention is applied to the lathe.

According to the machining apparatus having a construction shown in FIGS. 13 and 14, the workpiece 205 held by the chuck 206 is moved toward the tool 209 while the spindle 4 is rotated and revolved. Therefore, the workpiece 205 can be lathed by the tool 209. In this case, the workpiece 205 comes into contact with the tool 209 while rotating and revolving with the spindle 4, so that the workpiece 205 and the tool 209 are intermittently brought into contact with each other, whereby the intermittent cutting operation is performed. Therefore, chips generated during the cutting operation are broken into short segments, thereby being effectively exhausted in addition to the improvement in the working efficiency and surface roughness obtained in the foregoing specific embodiment.

Moreover, the invention is not limited to the apparatus and method for the cutting operations as described hereinbefore but can be applied to an apparatus and a method for performing other machining operations such as a grinding. In the invention, moreover, the cutting operation can be performed by moving the tool and the workpiece relatively to each other. Therefore, as one of the tool and the workpiece is rotated and revolved, the other of the tool and the workpiece is moved in the direction of at least one of three axes orthogonally crossing with each other to perform the cutting operation.

According to the invention, as described hereinbefore, the revolution shaft holding the spindle at an offset position is rotated on its own axis while the spindle is rotated, whereby allowing the tool or the workpiece mounted on the leading end of the spindle to be rotated and revolved. In this case, the revolution speed is not specifically restricted, so that the ratio of the speed by revolution to the cutting speed, that is, the relative feeding speed and feeding amount between the tool and the workpiece can be increased. According to the invention, therefore, the working efficiency can be improved, for example, by increasing the feeding amount in the contouring work. At the same time, the cutting width can be reduced without lowering the working efficiency, whereby the load on the edge is reduced and the life of the tool can be improved.

According to the invention, furthermore, both the motor for rotating the spindle and the motor for revolving the spindle can be fixed. With this construction, it is possible to reduce the mass to be rotated simultaneously with the revolution of the spindle, so that the revolution speed of the spindle can be raised to a high level. By employing a roller on a mechanism transmitting torque for rotating the spindle or a mechanism transmitting torque for revolving the spindle, moreover, it is possible to make rotation and revolution in which less oscillation or fluctuation is generated, and thereby the working accuracy can be improved.

The apparatus of the invention is provided with the aforementioned eccentric shaft, the rotation of which changes the off-set ratio of the tool or the workpiece to the revolution shaft. Therefore, the feeding amount or working radius of the tool or the workpiece can be voluntarily changed. By rotating the eccentric shaft during the cutting operation, morevoer, the taper cutting and the recessing operation can be performed.

Due to this construction, a mechanism for rotating the spindle, a mechanism for revolving the spindle and a mechanism for changing radius of revolution can operate independently from one another, and a heavy member such as a motor is not rotated in a circular motion. This makes it possible to revolve the spindle at a higher speed and to freely set a ratio of rotation number of the spindle to the revolution number of the same accordingly and further to voluntarily change the revolution radius of the spindle during its revolution.

With this balance adjustment, even when the revolution radius of the spindle is changed by rotating the eccentric shaft, the position of the center of gravity of the entire working apparatus does not change substantially. As a result, even when the revolution number of the spindle is increased, no vibration occurs. This makes it possible to increase the revolution speed of the spindle, that is, the tool or the workpiece without causing degradation in the working accuracy and increasing the load on the tool.

According to the machining method of the invention, a ratio of the rotation number of the tool or the workpiece to the revolution number is determined on the basis of the amount of working per unit time, that is, the working efficiency. Therefore, it is possible to set a rotation number and revolution number which have excellent working efficiency without shortening the life of the tool and increasing load on the tool.

According to another machining method of the invention, moreover, the ratio of rotation number of the tool to the revolution number of the same is set to a value below 37, so that a relative feed between the tool and the workpiece is increased in the intermittent cutting operation. As a result, cutting amount or working efficiency is not decreased even if the cutting width per blade is reduced. In other words, as the cutting width per blade is reduced without degradation of working efficiency, heat generation, cutting resistance and impact force can be reduced, thereby improving the life of the tool. By increasing the cutting amount per blade within the tool life, moreover, the working efficiency can be improved.

According to another machining method of the invention, the ratio of cutting speed established by the revolution of the tool or the workpiece is set to not less than 7%. As a result, the relative feeding speed between the tool and the workpiece is be increased, so that the load applied to the tool can be decreased according to the reduction of the cutting width per blade to improve the tool life and to improve the working efficiency by increasing the cutting amount within the life of the tool.

In the still another machining method of the invention, therefore, various working operations such as rough work or finish work can be performed by means of one apparatus or tool, resulting in the reduction in not only cost of installation but also in number of working steps to raise the working efficiency to a higher level.

According to still another machining method of the invention, when the machining operation is performed by moving the tool or the workpiece backwards and forwards in the axial direction, the ratio of rotation number to revolution number is varied according to a relative moving direction in the axial direction of the tool and the workpiece. This makes it possible to perform the rough work wherein the ratio of rotation number to revolution number is decreased and the finish work wherein this ratio is increased, while the tool or the workpiece is moved backwards and forwards in the axial direction. As a result, a total working time can be shortened to improve the productivity.

INDUSTRIAL APPLICABILITY

The apparatus and method of the invention can be applied to various machining operations, specially, cutting operations or grinding operations. Moreover, the proper setting of the ratio of the number of rotation of the tool or the workpiece to the number of revolution of the tool or the workpiece enable the situations in which the tool and the workpiece comes into contact with each other to be voluntarily changed. Therefore, this makes it possible to perform machining operations which are excellent in the working efficiency or working accuracy, whereby a high availability of such an apparatus and method can be achieved in the machining industry.

What is claimed is:

1. A machining apparatus for machining a workpiece by relatively rotating the workpiece and a tool, comprising:
    a revolution shaft held to rotate on an axis parallel to a center axis of the machining apparatus,
    a spindle rotating on an axis which is offset with respect to the center axis of the revolution shaft and parallel to a center axis of the revolution shaft and having a leading end on which one of the workpiece and the tool is mounted,
    a rotation driving mechanism for transmitting a power through a rotating member on a center axis of rotation of the revolution shaft or a member rotating integrally with the revolution shaft to the spindle to rotate the same, while rotating the revolution shaft and the spindle at different speeds respectively.

2. A machining apparatus according to claim 1,
    wherein the rotation driving mechanism includes: a motor for revolution fixed on a base portion, a transmission mechanism for revolution for transmitting a power from the motor for revolution to the revolution shaft, a motor for the spindle fixed on the base portion, and a transmission mechanism for the spindle for transmitting a power from the motor for the spindle to the spindle.

3. A machining apparatus according to claim 2,
    wherein the transmission mechanism for the spindle includes: a cylindrical member enclosing an outer circumference of the spindle; a plurality of first rollers fitted between the cylindrical member and the spindle so as to rotate and revolve and rotatably held by the revolution shaft; an input shaft inserted into the cylindrical member from an oposition side of the spindle and receiving a torque from the motor for the spindle; and a plurality of second rollers fitted between the input shaft and the cylindrical member so as to rotate and revolve and rotatably held by the revolution shaft.

4. A machining apparatus according to claim 1, wherein the revolution shaft includes an eccentric shaft rotating on an axis offset with respect to the center axis of the revolution shaft, and the spindle is rotatably held in a position offset with respect to the center axis of the eccentric shaft.

5. A machining apparatus according to claim 4, further comprising:
a revolution radius varying mechanism for rotating the eccentric shaft integrally with the revolution shaft and relatively with respect to the revolution shaft.

6. A machining apparatus according to claim 5, wherein the revolution radius changing mechanism includes a differential mechanism which performs a differentiating rotation operation through three rotary elements rotating relatively to one another, a first rotary element of the three rotary elements being connected to the transmission mechanism for revolution, a second rotary element being connected to the eccentric shaft, and a third rotary element being connected to a revolution radius changing motor fixed on the base portion.

7. A machining apparatus according to claim 4, wherein the spindle is balanced so that a center axis is aligned with the center of gravity; the eccentric shaft, on which the spindle is mounted in an offset position, is balanced so that a center axis is aligned with the center of gravity; and the revolution shaft, on which the eccentric shaft is mounted with holding the spindle rotatably, is balance so that a center axis is aligned with the center of gravity.

8. A machining method for machining a workpiece by rotating and revolving one of the workpiece and a tool and simultaneously by contacting the one of the workpiece and the tool with the other of the workpiece and the tool, comprising:
determining an amount of machining by the tool per unit time on the basis of at least one of a predetermined maximum machining sectional area and a predetermined machining speed,
setting a ratio of a number of rotation of the workpiece or the tool to a number of revolution of the workpiece or the tool on the basis of the amount of machining per unit time, and
machining the workpiece by rotating and revolving the workpiece or the tool so as to satisfy the ratio.

9. A machining method for rotating and revolving a tool having a cutting blade and intermittently cutting a workpiece by means of the tool,
wherein the workpiece is intermittently cut by means of the cutting blade mounted on the tool by setting a ratio of a number of rotation of the tool to a number of revolution of the tool to a value below 37.

10. A machining method for rotating and revolving a tool having a cutting blade and intermittently cutting a workpiece by means of the tool,
wherein the workpiece is cut by setting a ratio of a cutting speed depending on a revolution of the tool, as contained in a cutting speed of the cutting blade with respect to the workpiece obtained when the tool is rotated and revolved, to not less than 7%.

11. A machining method for machining a workpiece by rotating and revolving one of the workpiece and a tool and simultaneously contacting the one of the workpiece and the tool with the other of the workpiece and the tool,
wherein the workpiece is cut by changing a ratio of a number of rotation of the one of the workpiece and the tool to a number of revolution of the other of the workpiece and the tool on the basis of a roughness produced on a machined surface of the workpiece.

12. A machining method for machining a workpiece by rotating and revolving one of the workpiece and a tool and simultaneously contacting the one of the workpiece and the tool with the other of the workpiece and the tool, and moving the one of the workpiece and the tool backward and forward in a direction parallel to a center axis of a rotation,
wherein a ratio of a number of rotation to a number of revolution of the workpiece or the tool is made different between a machining step of moving one of the workpiece or the tool forward in a direction parallel to the center axis of rotation and a machining step of moving one of the workpiece or the tool backward in the direction parallel to the center axis of rotation.

* * * * *